United States Patent
Kim

(10) Patent No.: US 8,463,271 B2
(45) Date of Patent: Jun. 11, 2013

(54) APPARATUS AND METHOD FOR IMPROVING TRANSMITTING/RECEIVING PERFORMANCE BASED ON LOCATION INFORMATION OF MOBILE STATION IN COMMUNICATION SYSTEM

(75) Inventor: Min-Goo Kim, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 447 days.

(21) Appl. No.: 12/745,141

(22) PCT Filed: Nov. 27, 2008

(86) PCT No.: PCT/KR2008/006989
§ 371 (c)(1),
(2), (4) Date: May 27, 2010

(87) PCT Pub. No.: WO2009/069948
PCT Pub. Date: Jun. 4, 2009

(65) Prior Publication Data
US 2010/0273488 A1    Oct. 28, 2010

(30) Foreign Application Priority Data
Nov. 29, 2007    (KR) .................. 10-2007-0122597

(51) Int. Cl.
*H04W 36/00*    (2009.01)
(52) U.S. Cl.
USPC ........................................... 455/436
(58) Field of Classification Search
USPC ........................................... 455/436
See application file for complete search history.

(56) References Cited

U.S. PATENT DOCUMENTS

| | | | |
|---|---|---|---|
| 6,611,688 B1* | 8/2003 | Raith | 455/456.1 |
| 2002/0077060 A1* | 6/2002 | Lehikoinen et al. | 455/41 |
| 2003/0199269 A1* | 10/2003 | Tobe et al. | 455/422.1 |
| 2004/0203717 A1* | 10/2004 | Wingrowicz et al. | 455/423 |
| 2006/0128371 A1* | 6/2006 | Dillon et al. | 455/423 |
| 2007/0025293 A1 | 2/2007 | Choi | |
| 2009/0005119 A1* | 1/2009 | Patel et al. | 455/562.1 |
| 2010/0259444 A1* | 10/2010 | Kosolobov et al. | 342/357.42 |

FOREIGN PATENT DOCUMENTS
KR    10-0594112 B1    6/2006

OTHER PUBLICATIONS

Written Opinion of the Int'l Searching Authority (Form PCT/ISA/237) (4 pages).

* cited by examiner

*Primary Examiner* — Nathan Mitchell
(74) *Attorney, Agent, or Firm* — The Farrell Law Firm, P.C.

(57) ABSTRACT

An apparatus and method for improving transmitting/receiving performance based on location information of a Mobile Station (MS) in a communication system are provided. The method includes measuring coordinates of the MS to obtain the location information by using a navigation device, measuring received signal strengths of each Base Stations (BSs) according to the location information and transmitting the measurement result to a serving BS, receiving regional cell status information generated from the serving BS, and performing a transmitting/receiving operation according to a MS location included in the regional cell status information.

20 Claims, 11 Drawing Sheets

APPARATUS AND METHOD FOR IMPROVING TRANSMITTING/RECEIVING PERFORMANCE BASED ON LOCATION INFORMATION OF MOBILE STATION IN COMMUNICATION SYSTEM

TECHNICAL FIELD

The present invention relates to an apparatus and method for improving transmitting/receiving performance based on location information of a Mobile Station (MS) in a communication system. More particularly, the present invention relates to an apparatus and method for improving transmitting/receiving performance of an MS in an Orthogonal Frequency-Division Multiple Access (OFDMA) or Code Division Multiple Access (CDMA)-based communication system by creating data and sharing the created data with a Base Station (BS), wherein the data includes signal strengths and radio wave environments of neighboring BSs and also includes location information of the MS.

BACKGROUND ART

Recently, most mobile communication terminals (e.g., a mobile phone, a Personal Digital Assistant (PDA), a Portable Multimedia Player (PMP), a gaming tablet, etc.) use navigation devices to provide various services based on location information. Conventionally, coordinates of a mobile communication terminal are indirectly tracked with the aid of a network according to a Global Positioning System (GPS) included in a Base Station (BS). In recent years, however, the mobile communication terminal provides various services by utilizing a navigation device that is included in the mobile communication terminal to directly recognize a location of the mobile communication terminal according to the GPS.

In addition to the GPS operated by the United States of America, a new satellite navigation system called Galileo is scheduled to be implemented sooner or later by the European Union (EU). The whole world will be covered when coordinates are tracked by the new satellite navigation system. Accordingly, in general, most mobile communication terminals are expected to recognize their locations by using signals provided by the satellite navigation system.

Third Generation Partnership Project 2 (3GPP2) synchronization-type Code Division Multiple Access (CDMA) 2000, Institute of Electrical and Electronics Engineers (IEEE) 8021.6e, IEEE 802.16m, WiBro, mobile WiMAX, 3GPP Universal Mobile Telecommunication System (UMTS), 3GPP Long Term Evolution (LTE) systems are examples of mobile communication systems currently or scheduled to be commercialized. In these systems, a Mobile Station (MS) performs a Random Access (RA) process in order to access to a BS. The RA occurs when the MS accesses to a network upon generation of a call connection event while observing downlink paging or broadcasting messages in a state where power is initially on or when the MS registers its location at an arbitrary time.

In general, all MSs randomly perform the access process by sharing a limited uplink channel (or a reverse channel) assigned for the RA. Thus, an initial Transmit (Tx) power level and an access trial interval of each MS is an important factor for successful RA. An access state denotes a state where closed loop power control is not achieved by a BS. In this state, an MS has to decide and determine its initial Tx power without the aid of the BS. If the initial Tx power determined by the MS is significantly large, an RA success probability of the MS can increase. However, the significantly large initial Tx power causes an overhead of the entire wireless network and thus may result in a side effect in which a power level of a reverse interference signal increases. If the initial Tx power is significantly small, an RA signal of the MS may not be delivered to or recognized by the BS, thereby increasing an RA failure probability. Accordingly, the initial Tx power of the MS is generally determined to be slightly less than the level determined by the MS. If there is no response from the BS for the determined initial Tx power, transmission is repeated by slightly increasing the level. The MS determines its uplink Tx power by using a Received Signal Strength Indicator (RSSI) measured in downlink as expressed by Equation 1 below.

MathFigure 1

$$P\_ini = -P\_RSSI - 76 + NOM\_PWR + INI\_PWR - 16 \times NOM\_PWR\_EXT \qquad [Math.1]$$

In Equation 1, P_ini denotes an initial Tx power level. P_RSSI denotes a received signal strength. NOM_PWR denotes a compensation value for receiving an accurate power level by the BS and has a value in the range of −8 dB to +7 dB. INI_PWR denotes a compensation value, by which a first transmitted value of an RA channel initially has a slightly small value in the BS, and has a value in the range of −16 dB to +15 dB. NOM_PWR_EXT is used for compensation since fading is significant in case of a Personal Communication Service (PCS) system, and has a value of 0 or 1 (in case of a cellular system, 0).

FIG. 1 illustrates a signal flow process for establishing RA and traffic channels between an MS and a BS in a conventional communication system.

Referring to FIG. 1, a BS 100 generates system information in step 110, and transmits the system information to MSs in a cell coverage by using system paging or broadcasting messages in step 112.

When an MS 102 is powered on in step 114, the MS 102 selects a service provider system through which a service is provided to the MS, and performs initialization by obtaining synchronization of the system in step 116. In step 118, the MS 102 receives the system information by monitoring the paging or broadcasting messages, and measures a downlink received signal strength. In step 120, the MS 102 calculates a target Tx power level expressed by Equation 1 above by using the measured downlink received signal strength. Thereafter, if a user attempts a call or if an event such as registration occurs in step 122, the MS 102 attempts access to the BS according to the calculated Tx power in step 124.

In step 126, the BS 100 determines whether the Tx power level of the MS is proper and whether access collision does not occur with respect to another MS in order to examine a possibility of downlink call establishment. If the downlink call cannot be established, the BS 100 transmits a 'No Channel Assignment Message' in step 128. Then, the MS 102 recalculates the target Tx power level in step 130, reattempts a call after a specific time elapses in step 132, and reattempts access to the BS 100 in step 134.

In step 136, the BS 100 examines a possibility of downlink call establishment for the MS. If the call can be established, the BS 100 transmits a 'Channel Assignment Message' in step 138. Thereafter, the BS 100 establishes uplink and downlink traffic channels with respect to the MS 102 in step 140 and step 142.

The RA may be significantly delayed when an error exists in the Tx power level, wherein the Tx power level is determined directly by the MS by using a downlink RSSI. For example, in a case where the Tx power level is determined by an MS supporting a Frequency Division Duplexing (FDD) scheme according to the downlink RSSI of Equation 1, a channel may experience fast fading, shadowing, surrounding interference signals, etc., and thus a downlink received Signal to Noise Ratio (SNR) may change significantly. In this case, the Tx power level may have many errors.

The 3GPP2 synchronization-type systems may experience quality deterioration in received signals and cell capacity reduction due to mutual interference of BSs in an boundary region between adjacent cells as shown in FIG. 2. In addition, a handover success rate decreases due to mutual interference between the adjacent cells when a handover is performed.

To address the problems above, there is one conventional method in which an MS estimates interference of a control signal or a data traffic signal at a cell edge and then cancels the interference, similarly to a Successive Interference Cancellation (SIC) or Minimum Mean Square Error (MMSE) IC. There is another conventional method in which a control signal provided from a BS for interference cancellation is used to facilitate cancellation of interference of neighboring BSs. In a case where an MS directly cancels interference of the neighboring BSs, there is a limit in performance improvement, and implementation complexity of the MS increases excessively. In case of using the control signal of the BS, the control signal causes an entire cell overhead, and eventually results in the decrease of entire cell capacity. Since cell planning considers only an initial system installation environment in most cells currently in use, quality variation occurs when a new building is built or other systems are installed nearby, which leads to a problem in that information on the quality variation cannot be updated on a real time basis.

DISCLOSURE OF INVENTION

Technical Solution

An aspect of the present invention is to solve at least the above-mentioned problems and/or disadvantages and to provide at least the advantages described below. Accordingly, an aspect of the present invention is to provide an apparatus and method for improving transmitting/receiving performance based on location information of a Mobile Station (MS) in a communication system.

Another aspect of the present invention is to provide an apparatus and method for improving transmitting/receiving performance of an MS by creating data including location information determined directly by the MS and by sharing the created data with a Base Station (BS) in a communication system.

Another aspect of the present invention is to provide an apparatus and method for improving a random access success rate by calculating an initial Transmit (Tx) power level by using location information of an MS in a communication system.

Another aspect of the present invention is to provide an apparatus and method for improving handover performance by using location information of an MS and a received signal strength depending on a location of the MS in a communication system.

Another aspect of the present invention is to provide an apparatus and method for improving transmitting/receiving performance by reporting channel quality based on location information of an MS and a received signal strength depending on a location of the MS in a communication system.

Another aspect of the present invention is to provide an apparatus and method for improving transmitting/receiving performance by using Adaptive Modulation Coding (AMC) based on location information of an MS and a received signal strength depending on a location of the MS in a communication system.

In accordance with an aspect of the present invention, a method of operating an MS to improve transmitting/receiving performance based on location information in a communication system is provided. The method includes measuring coordinates of the MS to obtain the location information by using a navigation device, measuring received signal strengths of all BSs according to the location information and transmitting the measurement result to a serving BS, receiving regional cell status information generated for all regions from the serving BS, and performing a transmitting/receiving operation according to a current MS location included in the regional cell status information.

In accordance with another aspect of the present invention, a method of operating a BS to improve transmitting/receiving performance based on location information of an MS in a communication system is provided. The method includes receiving, from MSs in a cell, received signal strengths measured for all BSs according to the location information, generating regional cell status information for all regions by using the received signal strengths measured for all BSs according to the location information, and transmitting, to the MSs in the cell, the generated regional cell status information.

In accordance with another aspect of the present invention, an MS apparatus for improving transmitting/receiving performance based on location information in a communication system is provided. The apparatus includes a location information unit for obtaining the location information by measuring coordinates of the MS, a radio wave environment analyzer for measuring received signal strengths of all BSs according to the location information, and a communication controller for transmitting to a serving BS the received signal strength measured for each BS according to the location information, for receiving regional cell status information generated for all regions from the serving BS, and for performing a transmitting/receiving operation according to a current MS location included in the regional cell status information.

In accordance with another aspect of the present invention, a BS apparatus for improving transmitting/receiving performance based on location information of an MS in a communication system is provided. The apparatus includes a transmitting/receiving unit for receiving, from MSs in a cell, received signal strengths measured for all BSs according to the location information, and for transmitting, to the MSs in the cell, the generated regional cell status information, and a regional information generator for generating regional cell status information for all regions by using the received signal strengths measured for all BSs according to the location information.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

BEST MODE FOR CARRYING OUT THE INVENTION

Exemplary embodiments of the present invention will be described below with reference to the accompanying drawings. In the following description, well-known functions or constructions are not described in detail since they would obscure the invention in unnecessary detail.

A present invention described below is an apparatus and method for improving transmitting/receiving performance of a Mobile Station (MS) in a communication system by creating data and sharing the created data with a Base Station (BS), wherein the data includes signal strengths and radio wave environments of neighboring BSs and also includes location information of the MS.

Figure 1:
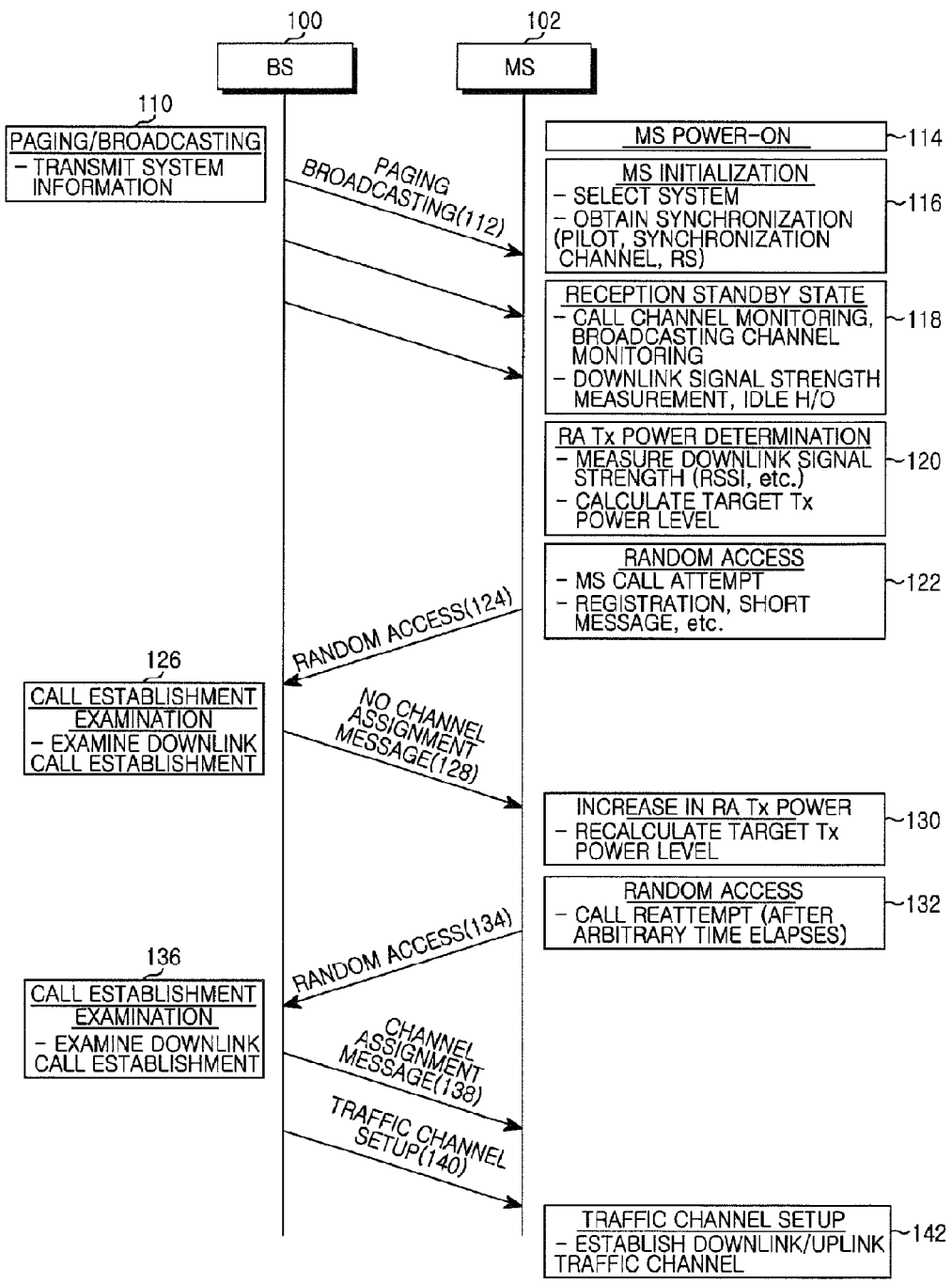
FIG. 1 illustrates a signal flow process for establishing Random Access (RA) and traffic channels between a Mobile Station (MS) and a Base Station (BS) in a conventional communication system.
Figure 2:
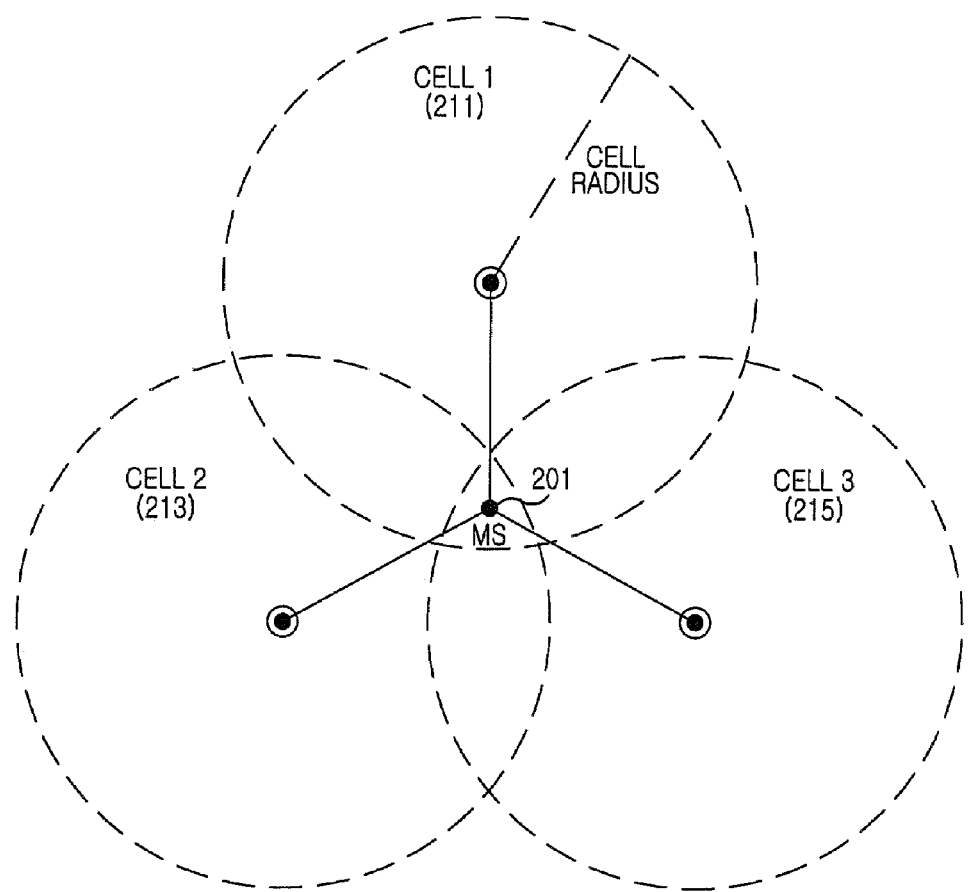
FIG. 2 illustrates interference experienced by an MS located in a cell boundary region in a cellular-based communication system.
Figure 3:
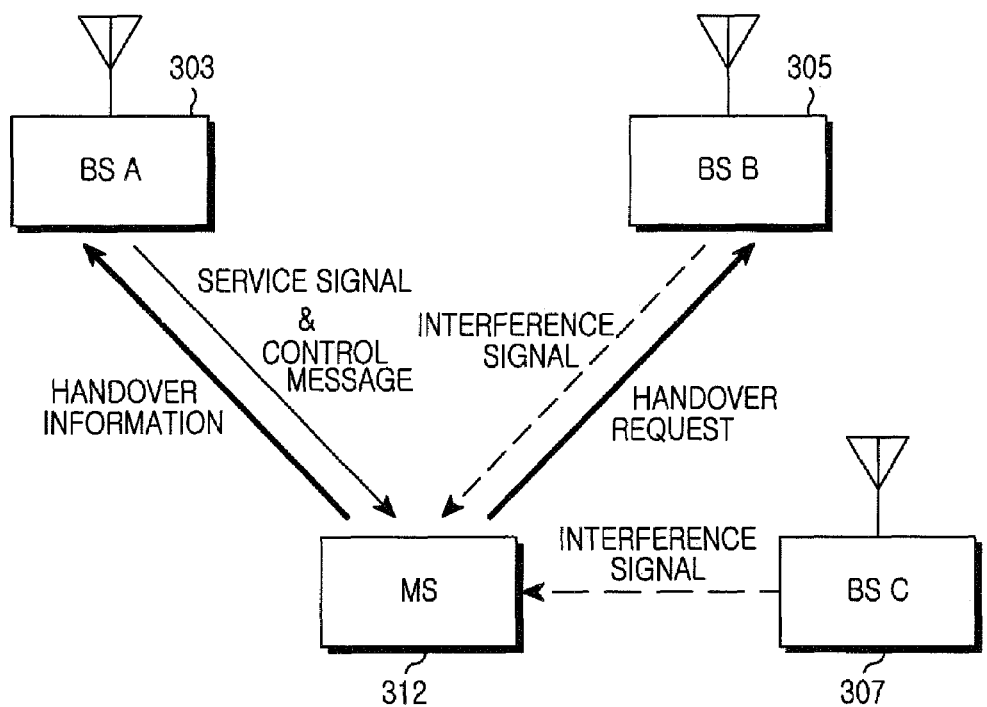
FIG. 3 illustrates a method of operating an MS in a cellular-based communication system.

To facilitate explanation of the present invention, basic terms are first defined with reference to FIG. 3. Referring to FIG. 3, a 'serving BS' is a BS A 303 from which an MS 312 receives a service. 'Interfering BSs' are neighboring BS B 305 and BS C 307 which interfere signals transmitted and received between the serving BS 303 and the MS 312. A 'handover target BS' is the BS 305 to which the MS 312 desires to perform a handover. In most cases, until the handover is made, an interfering BS having a strongest interference has a high possibility to be a handover target BS in a boundary region of a cell to which the handover is considered to be performed. Therefore, the handover target BS may be included in the interfering BS.

The MS 312 of the present invention is equipped with a navigation device. The navigation device may be a device that recognizes a location of the MS with the aid of the BS or may be an independent navigation module that has a function for detecting coordinates of the MS without the aid of the BS. That is, the MS 312 includes the navigation device that can obtain actual coordinates of the MS at a desired time irrespective of an operation type of the navigation device. The coordinates are significantly broad in concept. In the present invention, it is assumed that the coordinates imply data for recognizing detailed locations (e.g., latitude and longitude coordinates).

Figure 4:
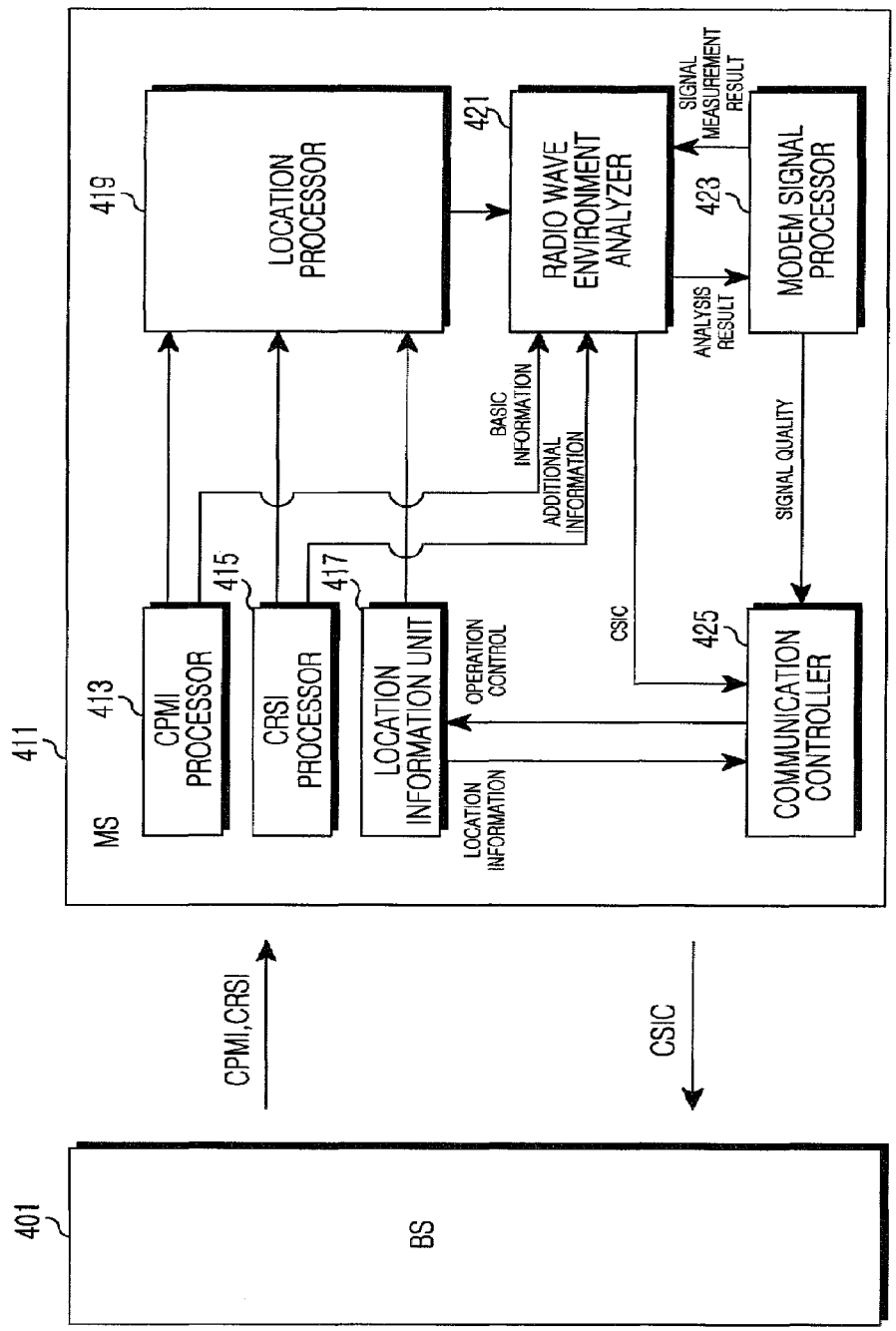
FIG. 4 is a block diagram illustrating an MS and a BS for performing communication in a communication system according to an exemplary embodiment of the present invention.

FIG. 4 is a block diagram illustrating an MS and a BS for performing communication in a communication system according to an exemplary embodiment of the present invention.

Referring to FIG. 4, a BS 401 transmits Cell Planning Map Information (CPMI), which is system information on a surrounding environment at a time when a cell is established, to an MS 411 in the cell through various data channels such as a broadcast channel, a paging channel, a traffic channel, etc. The CPMI is location-based information which does not much vary. The CPMI includes a cell radius, power attenuation depending on a distance, a BS location, a maximum Transmit (Tx) power, a coverage, system information (i.e., cell IDentifier (ID)), etc. If modified information exists, the CPMI is retransmitted to the MS 411 in the cell through the various data channels.

In addition, the BS 401 transmits Cell Radio Status Information (CRSI) to all MSs 411 in the cell on a real time basis. The CRSI includes Tx power levels of various signals such as a traffic data signal, a control signal, a pilot signal, a reference signal, etc. Information amount of the CRSI increases in proportion to the number of BSs. Thus, the CRSI can be optionally intermittently transmitted by considering an overall system overhead.

When the MS 411 is powered on, the MS 411 receives the CPMI from the BS 401 on a real time basis through the paging channel or the broadcast channel and then stores the received CPMI. In this case, the CPMI may be pre-stored in a process of manufacturing the MS. Further, the MS 411 receives the CRSI from the BS 401 and stores the received CRSI.

Figure 5:
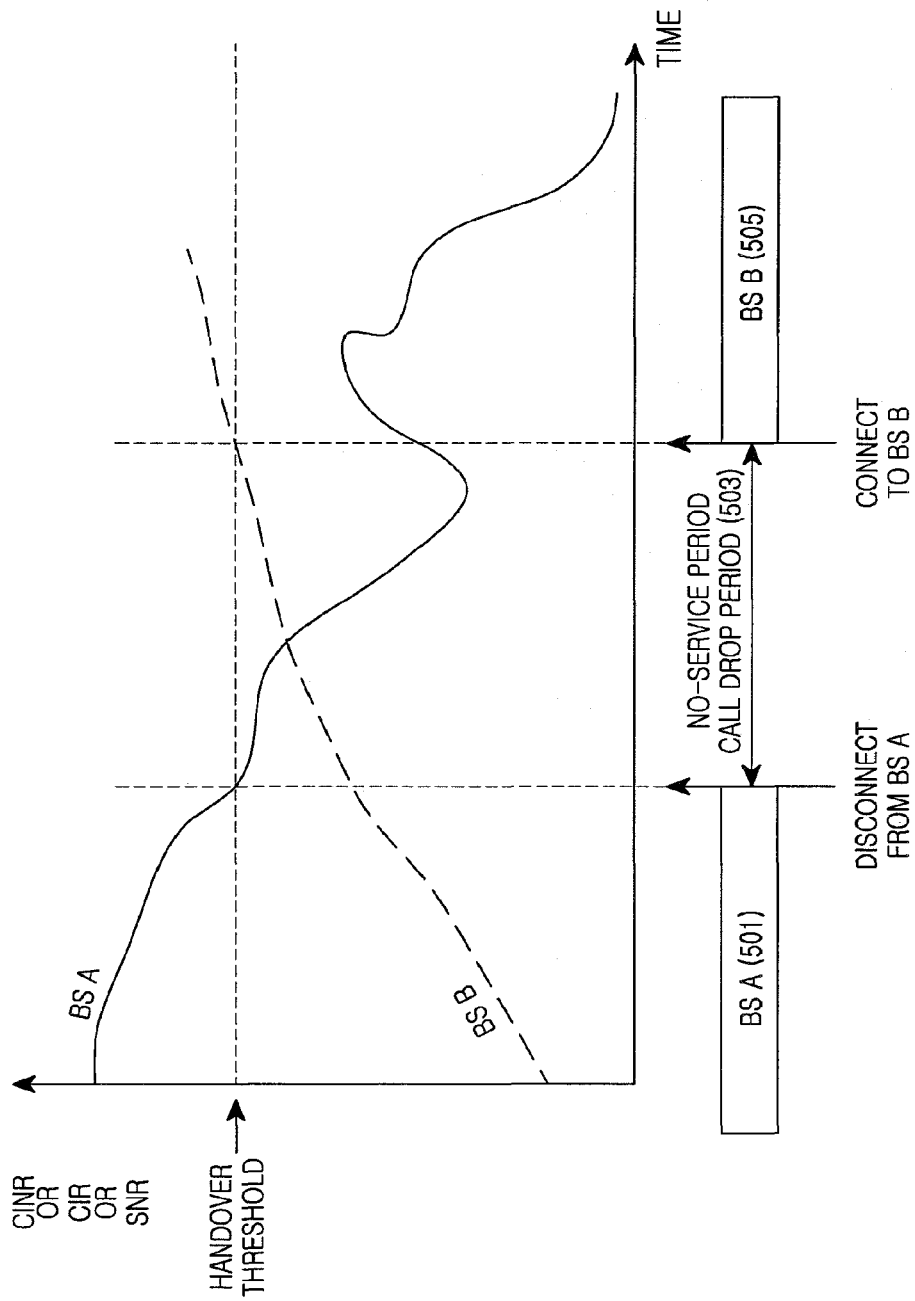
FIG. 5 is a graph illustrating variation of received signal strengths depending on a distance between an MS and a BS in a conventional communication system.

Furthermore, the MS 411 recognizes coordinates X_MS and Y_MS indicating a location of the MS by using a navigation device included in the MS, generates Cell Status Information of Coordinate (CSIC) depending on the location of the MS, and transmits the CSIC to the BS 401. For example, as shown in FIG. 5, the MS 411 receives signals from a serving BS and a neighboring BS, measures received signal strengths that vary according to the location of the MS, generates the CSIC on the basis of the measured received signal strengths, and transmits the CSIC to the BS 401. Upon receiving a signaling message for requesting the CSIC from the BS 401, the MS 411 collects information depending on the location of the MS and transmits the collected information to the BS through an uplink traffic channel or an uplink control channel or other data channels.

The BS 401 performs control for improving entire cell capacity by utilizing the CSIC received from the MS 411, updates entire call planning information (i.e., CPMI), and transmits the updated CPMI to the MS 411. For example, the BS 401 may include a regional information generator (not shown) for generating information for all regions to predict variation of the received signal strength measured for the MS according to the location of the MS by using received signal strength information, which is measured for each BS according to the location of the MS and which is received from the MS 411, and estimates a received signal strength according to regional coordinates by using the prediction result. Then, the BS 401 determines a region where a handover occurs in a cell boundary according to the estimation result, and determines a modulation and coding scheme for each region. Thereafter, the BS 401 transmits the determined information to each MS so that each MS operates according to the determined information.

Now, a detailed structure of the MS 411 will be described.

As shown in FIG. 4, the MS 411 includes a CPMI processor 413, a CRSI processor 415, a location information unit 417, a location processor 419, a radio wave environment analyzer 421, a modem signal processor 423, and a communication controller 425.

The CPMI processor 413 receives CPMI from the BS 401. After analyzing and storing the received CPMI, the CPMI processor 413 provides location information (i.e., coordinates X_BS and Y_BS) of a plurality of BSs to the location processor 419, and provides basic information stored in each BS to the radio wave environment analyzer 421. Examples of the basic information include a cell radius, power attenuation depending on a distance, a BS location, a maximum Tx power, a coverage, system information (i.e., cell ID), etc.

The CRSI processor 415 receives CRSI from the BS 401. After analyzing and storing the received CRSI, the CRSI processor 415 provides the CRSI to the radio wave environment analyzer 421.

As a navigation device, the location information unit 417 recognizes location information by measuring coordinates X_MS and Y_MS of the MS, and provides the location information to the location processor 419. In this case, the coordinates of the MS may be measured on a real time basis at a time desired by the MS or may be measured periodically or non-periodically at a predetermined time. For example, the coordinates may be measured when the CSIC is requested from the BS or may be measured in every predetermined period.

The location processor 419 calculates a difference of coordinates between the MS and a serving BS (or an interfering BS) by using the location information (i.e., coordinates X_BS and Y_BS) of each BS, which is provided from the CPMI processor 413, and by using the location information (i.e., coordinates X_MS and Y_MS) of the MS, which is provided from the location information unit 417. Thus, the location processor 419 obtains a distance between the MS and the serving BS (or the interfering BS). Then, the location processor 419 provides the obtained distance to the radio wave environment analyzer 421. Further, the location processor 419 calculates additional information for modem control by using the location information of each BS and the location information of the MS. The location processor 419 can update the previous CSIC according to location information of neighboring cells and the location information of the MS. Further, the location processor 419 can observe a handover target BS to receive a next service.

Information indicating the distance between the BS and the MS is received from the location processor 419. A variety of measurement data is provided from the modem signal processor 423. Cell status information is provided from the CPMI processor 413. By using the distance information, the measurement data, and the cell status information, the radio wave environment analyzer 421 calculates an interference amount and a strength of a signal received from each BS. Further, the radio wave environment analyzer 421 can measure a speed of the MS according to location information depending on time variation. Furthermore, the radio wave environment analyzer 421 combines channel estimation values or received signal qualities measured by the modem signal processor 423 at a time that is the same as a coordinate-measurement time of the location processor 419. Thus, the location processor 419 generates two-dimensional data including a radio wave environment and a signal strength of each BS, and provides the generated data to the communication controller 425. For example, the two-dimensional data may be a channel estimation value or a received signal quality measured for each BS according to the location information of the MS. The radio wave environment analyzer 421 may also generate three-dimensional data (i.e., time, coordinates, and cell system information) by adding time information to the two-dimensional data (i.e., coordinates and cell system information). The two-dimensional data and the three-dimensional data imply the CSIC.

An analysis result obtained from the radio wave environment analyzer 421 can be utilized as auxiliary information for determining an interference signal received from the MS or for deciding a handover. Radio wave environment information (i.e., CRSI) transmitted by neighboring BSs at a current time can be utilized for a further precise analysis. However, receiving of the CRSI from the neighboring BSs results in the increase of an entire system overhead, and thus its implementation is improbable. Therefore, it may be effective to use the CPMI as basic information and the CRSI as additional information.

The location processor 419 and the radio wave environment analyzer 421 may be integrated as one element according to implementation of the MS.

The modem signal processor 423 receives a variety of information (i.e., interference signal distribution for each BS, speed estimation, average signal strength at a current location, handover region identification, etc.) from the radio wave environment analyzer 421, and uses the received information to process a modem signal. For example, the modem signal processor 423 can calculate additional information (i.e., average power loss from the serving BS, distance-dependent power loss, etc.) and can use the additional information to provide modem control. The modem signal processor 423 can also calculate additional information (i.e., average power loss from the interfering BS, distance-dependent power loss, etc.) and can use the additional information to provide modem control. Further, the modem signal processor 423 calculates average power loss depending on the distance between the BS and the MS, and estimates an instantaneous signal variation by comparing strengths of interference signals actually delivered from the respective BSs.

A reference value for a signal power level depending on coordinates of respective neighboring BSs is provided from the BS. By using the reference value, the modem signal processor 423 preferentially selects a BS that provides a best quality signal on average at the location of the MS. Further, the modem signal processor 423 can intentionally measure a signal strength from a BS of each neighboring cell by using masking information based on a cell ID of each BS, and thus can directly update cell MAP information of the MS. In this case, information such as masking information depending on the cell ID of each BS can be provided in advance from the serving BS by using the CPMI.

The communication controller 425 receives CSIC from the radio wave environment analyzer 421 and transmits the received CSIC to the BS 401. The communication controller 425 receives information (i.e., CSIC and signal quality information) from the radio wave environment analyzer 421 and the modem signal processor 423, and transmits the received information to the BS 401. The information transmitted to the BS 401 can be utilized by the BS as statistic information for handover or cell configuration by the use of signal strength information measured with respect to each BS according to the location of the MS. The communication controller 425 receives a request of the CSIC information transmission from the BS, and transmits the CSIC information in response to the request or transmits the CSIC information in every predetermined period. Further, the communication controller 425 provides control and processing for performing specific operations (e.g., determining of an initial Tx power level, a handover, reporting of channel quality, and determining of a modulation and coding scheme) according to regional cell status information received from the BS.

Now, a method of improving system performance by using location information of the MS and received signal strength information depending on the location information will be described.

Figure 6:
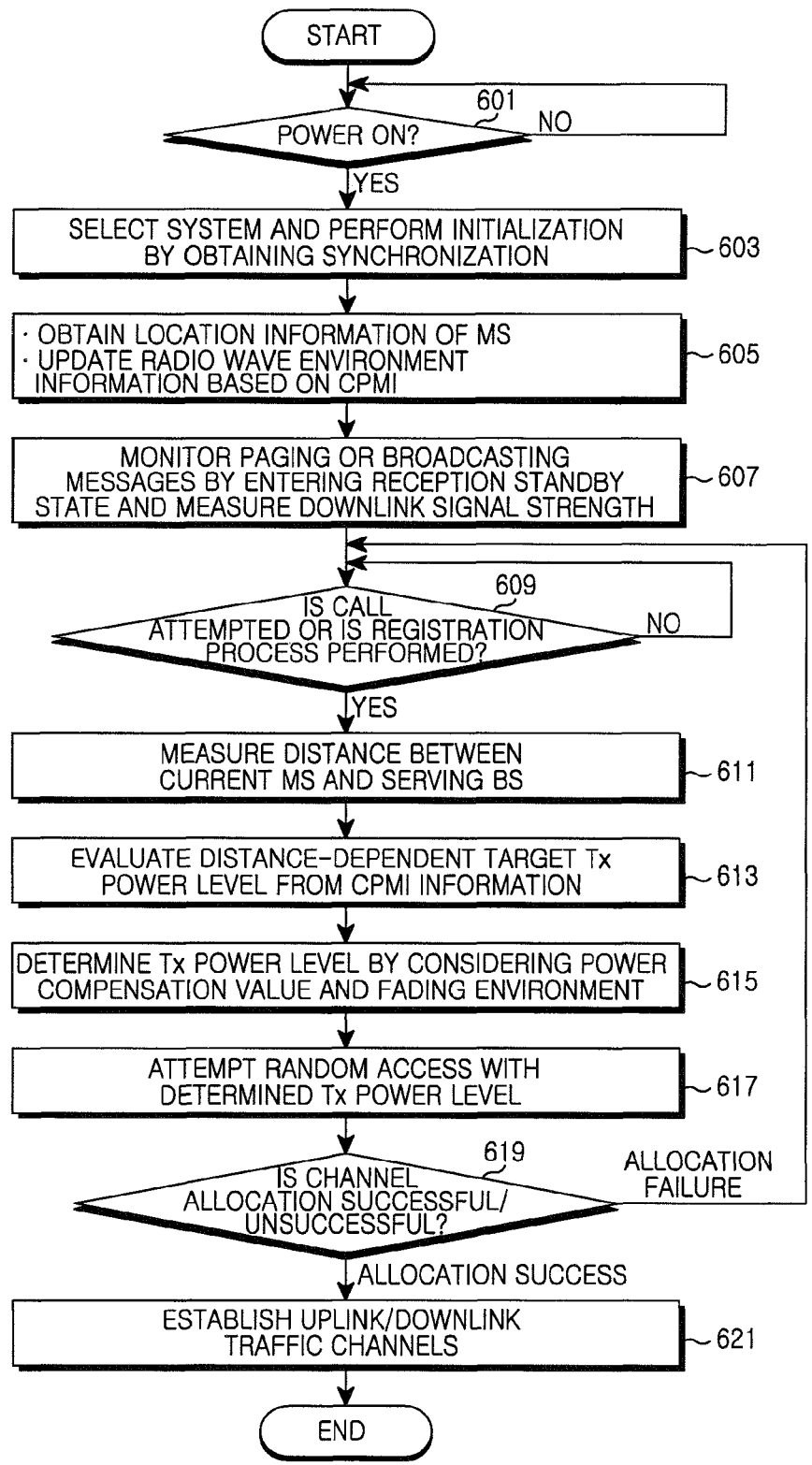
FIG. 6 is a flowchart illustrating an operation of an MS for establishing RA and traffic channels in a communication system according to an exemplary embodiment of the present invention.

FIG. 6 is a flowchart illustrating an operation of an MS for establishing RA and traffic channels in a communication system according to an exemplary embodiment of the present invention. In the following description, it will be assumed that open loop power control is used in a method of controlling Tx power. However, the present invention can also apply to closed loop power control, inner loop power control, and outer loop power control.

Referring to FIG. 6, when power is on in step 601, the MS selects a service provider system through which a service is provided to the MS, and performs initialization by obtaining synchronization of the system in step 603. In step 605, the MS measures its coordinates by using a navigation device to obtain location information, and updates radio wave environment information according to CPMI received from a BS.

In step 607, the MS monitors the paging or broadcasting messages by entering a reception standby state, and measures a downlink received signal strength. In step 609, the MS determines whether a user attempts a call or whether a registration process is performed.

If the call is attempted or the registration process is performed, the MS measures a distance between a serving BS and the MS currently in use in step 611. In step 613, the MS evaluates a target Tx power level from CPMI updated by the BS, wherein the target Tx power level depends on a duration, coordinates of the MS, and the distance between the BS and the MS. According to data measured in advance with respect to an entire cell coverage, the BS transmits to the MS a Tx power compensation value for compensation based on coordinates. The MS stores the Tx power compensation value in a CPMI processor. The compensation value may be provided using the paging message or using CRSI.

In step 615, the MS determines the target Tx power level by considering a fading environment and a power compensation value as expressed by Equation 2 or Equation 3 below.

Equation 2 below is used to determine an initial Tx power level according to the coordinates of the MS.

MathFigure 2

$$P\_ini = PWR\_CPMI + OFFSET\_PWR \quad [\text{Math.2}]$$

In Equation 2, P_ini denotes an initial Tx power level of the MS. PWR_CPMI denotes an average Tx power level depending on coordinates or a distance included in the CPMI. OFFSET_PWR denotes a compensation value by which the initial Tx power level is set to below the average Tx power level.

Equation 3 below is used to determine an initial Tx power level according to the coordinates of the MS in the fading environment.

MathFigure 3

$$P\_ini = PWR\_CPMI + OFFSET\_PWR + FADE\_PWR * ALPHA$$

$$FADE\_PWR = |DL\_PWR\_CPMI - RSSI(dBm)| \quad [\text{Math.3}]$$

In Equation 3, P_ini denotes an initial Tx power level of the MS. PWR_CPMI denotes an average Tx power level depending on coordinates or a distance included in the CPMI. OFFSET_PWR denotes a compensation value by which the initial Tx power level is set to below the average Tx power level. FADE_PWR denotes a value indicating signal strength variation depending on instantaneous fading, and is represented with a difference between RSSI(dBm) and DL_PWR_CPMI (dBm). Herein, the RSSI(dBm) denotes a downlink received signal strength, and DL_PWR_CPMI(dBm) denotes a downlink average signal strength depending on the distance between the BS and the MS and stored in the current CPMI. Herein, FADE_PWR has a value close to '0' when the MS does not move and frequency selective sensitivity is not considered. ALPHA denotes a scaling factor for regulating a fading effect of Tx power.

In step 617, the MS attempts random access with the determined Tx power level. In step 619, the MS determines whether a channel allocation success message or a channel allocation failure message is received from the serving BS.

Upon receiving the channel allocation failure message, returning to step 611, the MS re-measures the distance between the serving BS and the MS currently in use and then repeats the subsequent steps. Upon receiving the channel allocation success message, proceeding to step 621, the MS establishes uplink and downlink traffic channels. Thereafter, the procedure of FIG. 6 ends.

Figure 7:
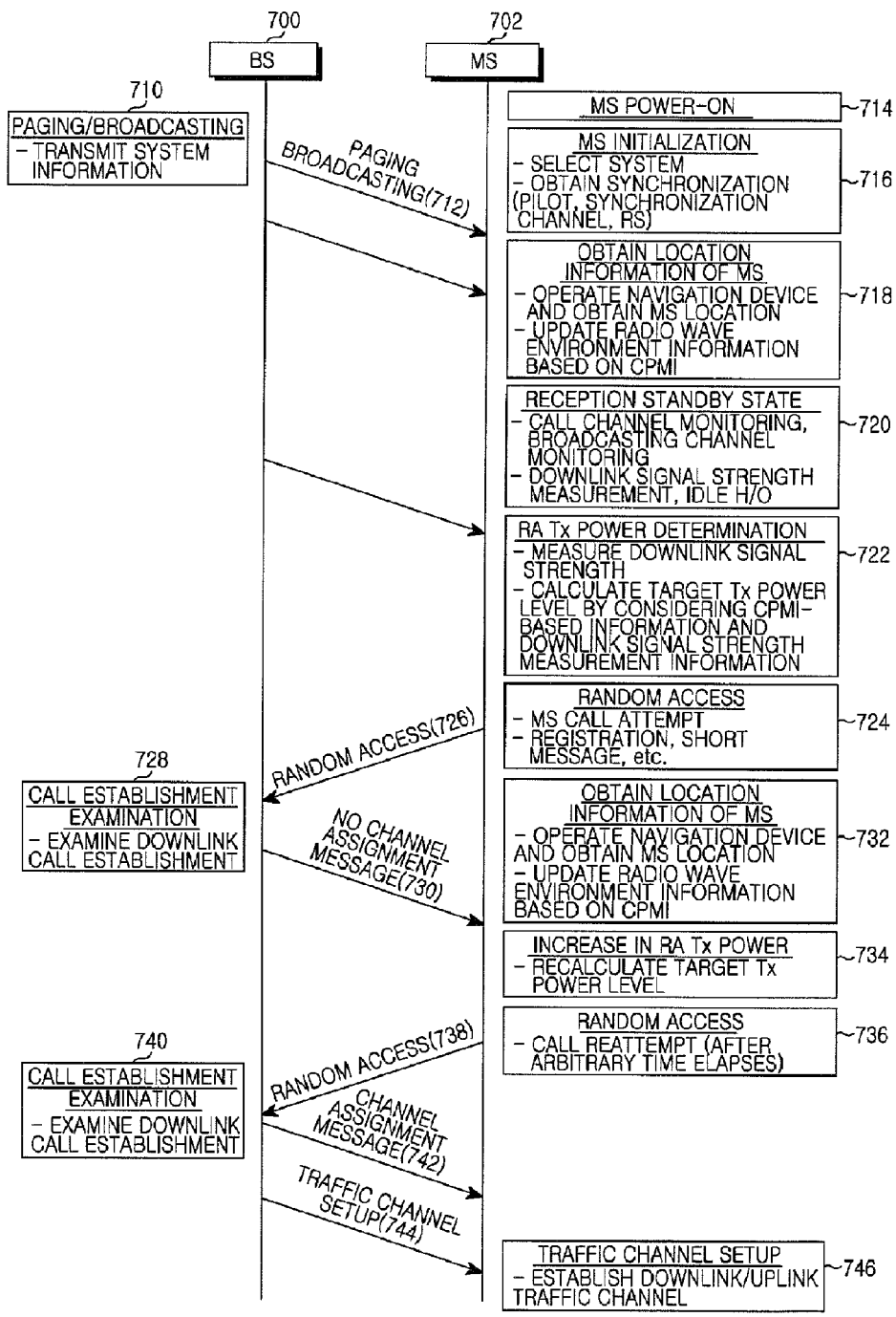
FIG. 7 is a flowchart illustrating a signal flow process for establishing RA and traffic channels between an MS and a BS in a communication system according to an exemplary embodiment of the present invention.

FIG. 7 is a flowchart illustrating a signal flow process for establishing RA and traffic channels between an MS and a BS in a communication system according to an exemplary embodiment of the present invention.

Referring to FIG. 7, a BS 700 generates system information in step 710, and transmits the system information to MSs in a cell coverage by using system paging or broadcasting messages in step 712.

When an MS 702 is powered on in step 714, the MS 702 selects a service provider system through which a service is provided to the MS, and performs initialization by obtaining synchronization of the system in step 716. In step 718, the MS 702 measures its coordinates by using a navigation device to obtain location information, and updates radio wave environment information according to CPMI received from the BS. In step 720, the MS 702 monitors the paging or broadcasting messages by entering a reception standby state, and measures a downlink received signal strength.

In step 722, the MS 702 evaluates a Tx power level from CPMI updated by the BS and measures a received signal strength, wherein the Tx power level depends on a duration, coordinates of the MS, and a distance between the BS and the MS currently in use. Thereafter, the MS 702 determines an initial Tx power level according to Equation 2 or Equation 3 above. If a user attempts a call or if an event such as registration occurs in step 724, the MS 702 attempts access to the BS according to the calculated Tx power in step 726.

In step 728, the BS 700 determines whether the Tx power level of the MS is proper and whether access collision does not occur with respect to another MS in order to examine a possibility of downlink call establishment. If the downlink call cannot be established, the BS 700 transmits a 'No Channel Assignment Message' in step 730.

In step 732, the MS 702 re-measures its current coordinates to obtain location information, and updates radio wave environment information according to the CPMI. In step 734, the MS 702 recalculates the target Tx power level. Thereafter, the MS 702 reattempts a call after a specific time elapses in step 736, and reattempts access to the BS 700 in step 738.

In step 740, the BS 700 examines a possibility of downlink call establishment for the MS. If the call can be established, the BS 700 transmits a 'Channel Assignment Message' in step 742. Thereafter, the BS 700 establishes uplink and downlink traffic channels with respect to the MS 702 in step 744 and step 746.

Figure 8:
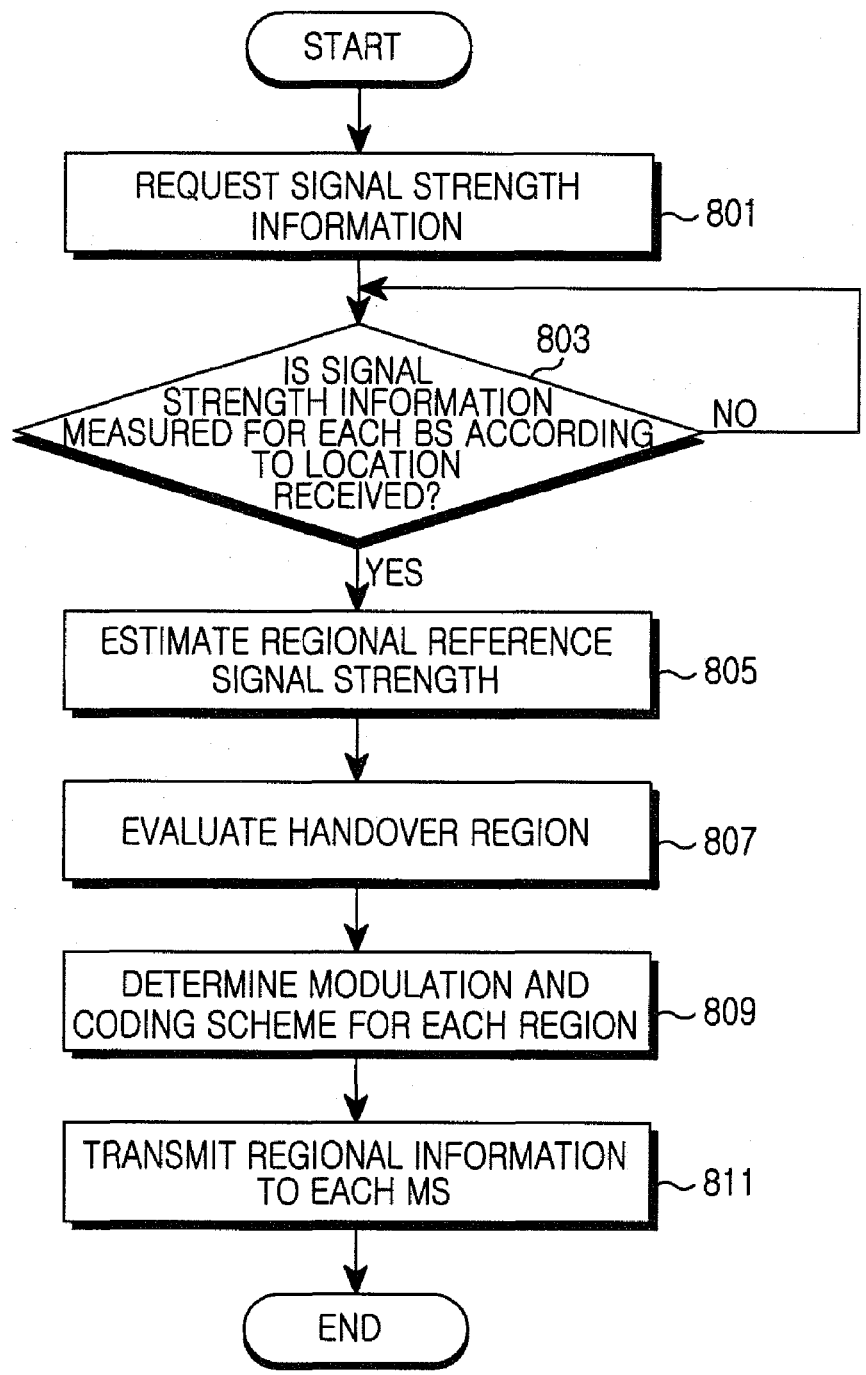
FIG. 8 is a flowchart illustrating a process of generating regional information by a BS to improve transmitting/receiving performance by using location information of an MS in a communication system according to an exemplary embodiment of the present invention.

FIG. 8 is a flowchart illustrating a process of generating regional information by a BS to improve transmitting/receiving performance by using location information of an MS in a communication system according to an exemplary embodiment of the present invention.

Referring to FIG. 8, the BS requests MSs, each of which receives a service from the BS, to send signal strength information in step 801, and determines whether the signal strength information is received from the MSs in step 803, wherein the signal strength information is measured for all BSs according to locations of the MSs. At the request of the BS, the MSs may measure instantaneous received signal strengths of neighboring BSs according to the locations of the MSs and then transmit the measurement result to the BS. Alternatively, the MSs may calculate an average of received signal strengths measured for a specific duration and transmit the measurement result to the BS. Accordingly, the BS receives the signal strength information measured for each BS according to the MS location.

Upon receiving the information, in step 805, the BS predicts a location-dependent received signal strength variation of an MS and estimates a received signal strength according to regional coordinates by using the prediction result. In this case, the BS may estimate the received signal strength for each region by averaging received signal strengths of the MS or may estimate received signal strength for each region by averaging values which indicate the received signal strength of the MS and which are greater than a threshold.

In step 807, the BS statistically determines regions where a handover occurs in a cell boundary according to the received signal strength depending on estimated regional coordinates. In step 809, the BS determines a modulation and coding scheme for each region. That is, the BS can predict distance-dependent reception sensitivity of the MS within a coverage according to Tx power of the BS. Further, the BS estimates in advance an Adaptive Modulation Coding (AMC) level at which signals can be successfully received by the MS at a specific time and a specific location by using information (e.g., speed estimation information, channel estimation information, etc.) provided by the MS.

In step 811, the BS generates regional information and transmits the regional information to each MS. The regional information includes a received signal strength depending on the regional coordinates, a region where a handover occurs, and a modulation and coding scheme for each region. Thereafter, the procedure of FIG. 8 ends.

Figure 9:
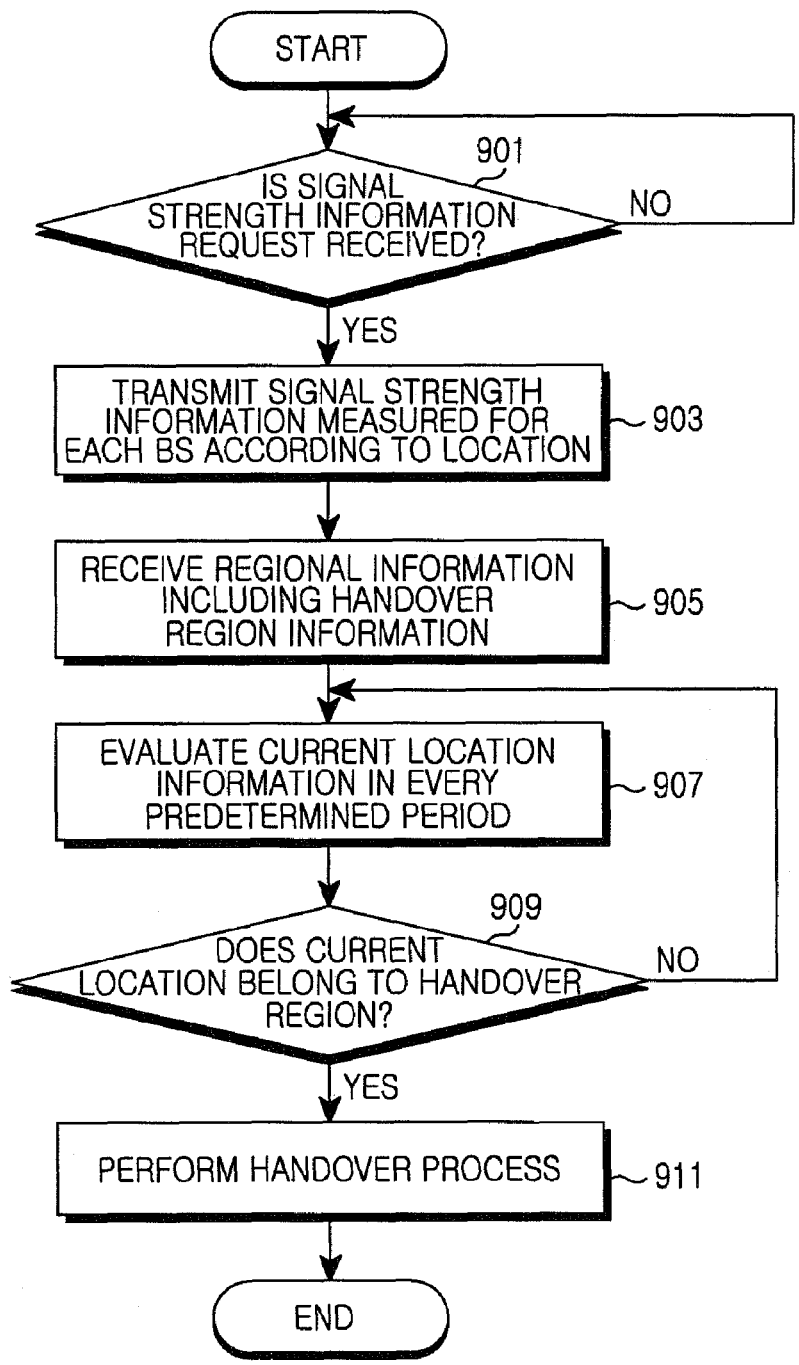
FIG. 9 is a flowchart illustrating a handover process of an MS by using location information in a communication system according to an exemplary embodiment of the present invention.

FIG. 9 is a flowchart illustrating a handover process of an MS by using location information in a communication system according to an exemplary embodiment of the present invention.

Referring to FIG. 9, the MS determines whether a message for requesting transmission of signal strength information is received from a serving BS of the MS in step 901. If the message is received, proceeding to step 903, the MS transmits received signal strength information measured for each BS according to a location of the MS. In step 905, the MS receives regional information from the serving BS. The regional information includes handover region information. In this case, the MS may measure instantaneous received signal strengths of neighboring BSs according to the location of the MS and then transmit the measurement result to the BS. Alternatively, the MS may calculate an average of received signal strengths measured for a specific duration and transmit the measurement result to the BS.

In step 907, the MS measures its current coordinates in every predetermined period to obtain location information. In step 909, the MS determines whether its current location belongs to the handover region. If the current MS location does not belong to the handover region, returning to step 907, the MS repeats the subsequent steps.

Otherwise, if the current MS location belongs to the handover region, the MS performs a handover process in step 911. Thereafter, the procedure of FIG. 9 ends.

As described above, in the present invention, the MS receives in advance information regarding a handover region depending on coordinates from the BS and thus recognizes the handover region. Accordingly, it is possible to reduce a probability that an unnecessary handover is attempted when an erroneous decision is made due to variation of an instantaneous received signal strength. In addition, the handover can be performed in a further reliable manner.

Figure 10:
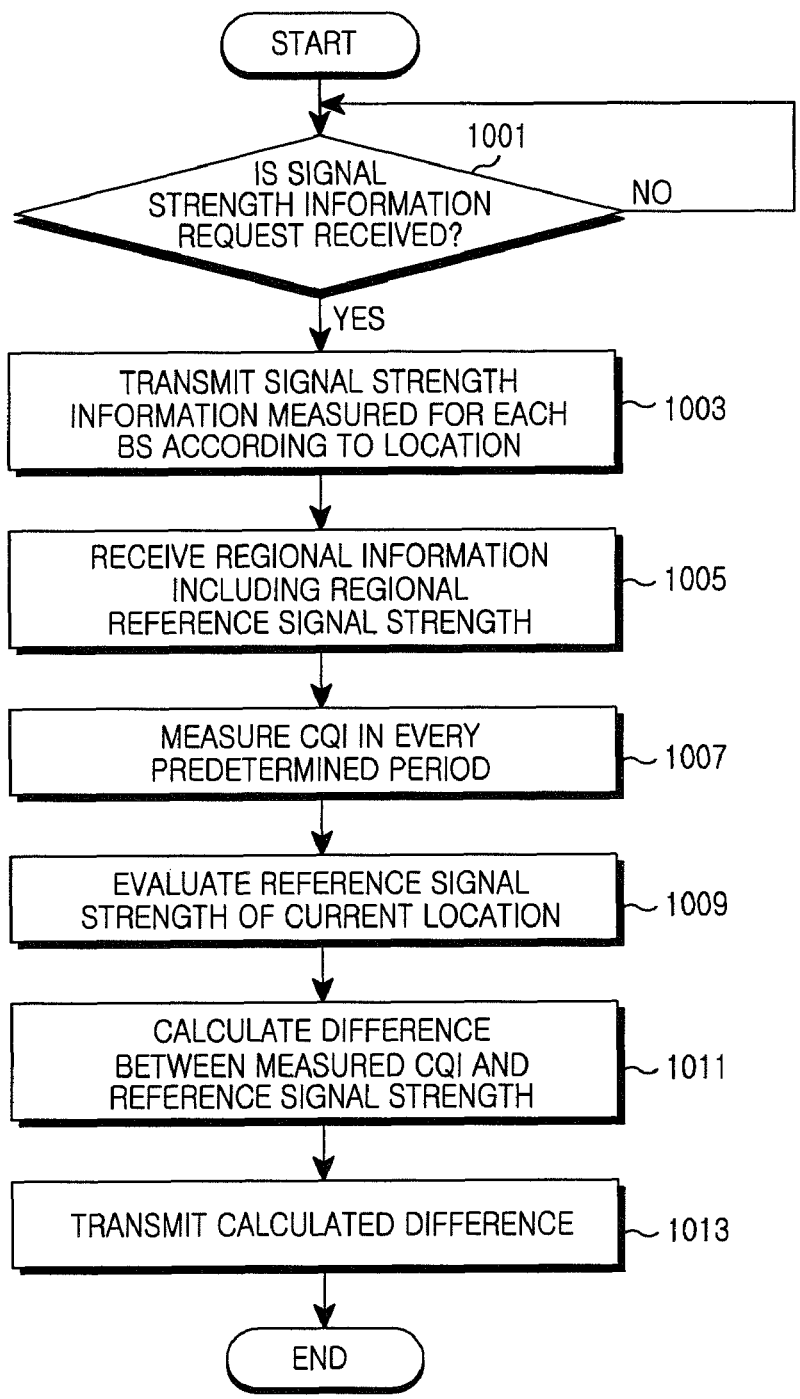
FIG. 10 is a flowchart illustrating a process of reporting channel quality of an MS by using location information in a communication system according to an exemplary embodiment of the present invention.

FIG. 10 is a flowchart illustrating a process of reporting channel quality of an MS by using location information in a communication system according to an exemplary embodiment of the present invention.

Referring to FIG. 10, the MS determines whether a message for requesting transmission of signal strength information is received from a serving BS of the MS in step 1001. If the message is received, proceeding to step 1003, the MS transmits received signal strength information measured for all BSs according to a location of the MS. In step 1005, the MS receives regional information from the serving BS. The regional information includes strengths of signals received for all regions. In this case, the MS may measure instantaneous received signal strengths of neighboring BSs according to the location of the MS and then transmit the measurement result to the BS. Alternatively, the MS may calculate an average of received signal strengths measured for a specific duration and transmit the measurement result to the BS.

In step 1007, the MS measures its channel reception state quality (i.e., a Channel Quality Indicator (CQI)) in every predetermined period. In step 1009, the MS measures its current coordinates to obtain location information and thereafter evaluates a reference received signal strength of a current location from the received regional information. In step 1011, the MS calculates a difference between the reference received signal strength and the received signal strength measured by the MS. In step 1013, the MS transmits the calculated difference to the serving BS. Thereafter, the procedure of FIG. 10 ends.

As described above, in the present invention, the MS receives from the serving BS the reference received signal strength according to coordinates, compares the reference received signal strength with the received signal strength measured by the MS to obtain the difference between the received signal strengths, and transmits only the difference to the serving BS when the CQI is reported. Therefore, CQI reporting can be further accurately performed since only information on a variation amount is transmitted, wherein the variation occurs due to channel fading or due to duplication of several interference signals.

Figure 11:
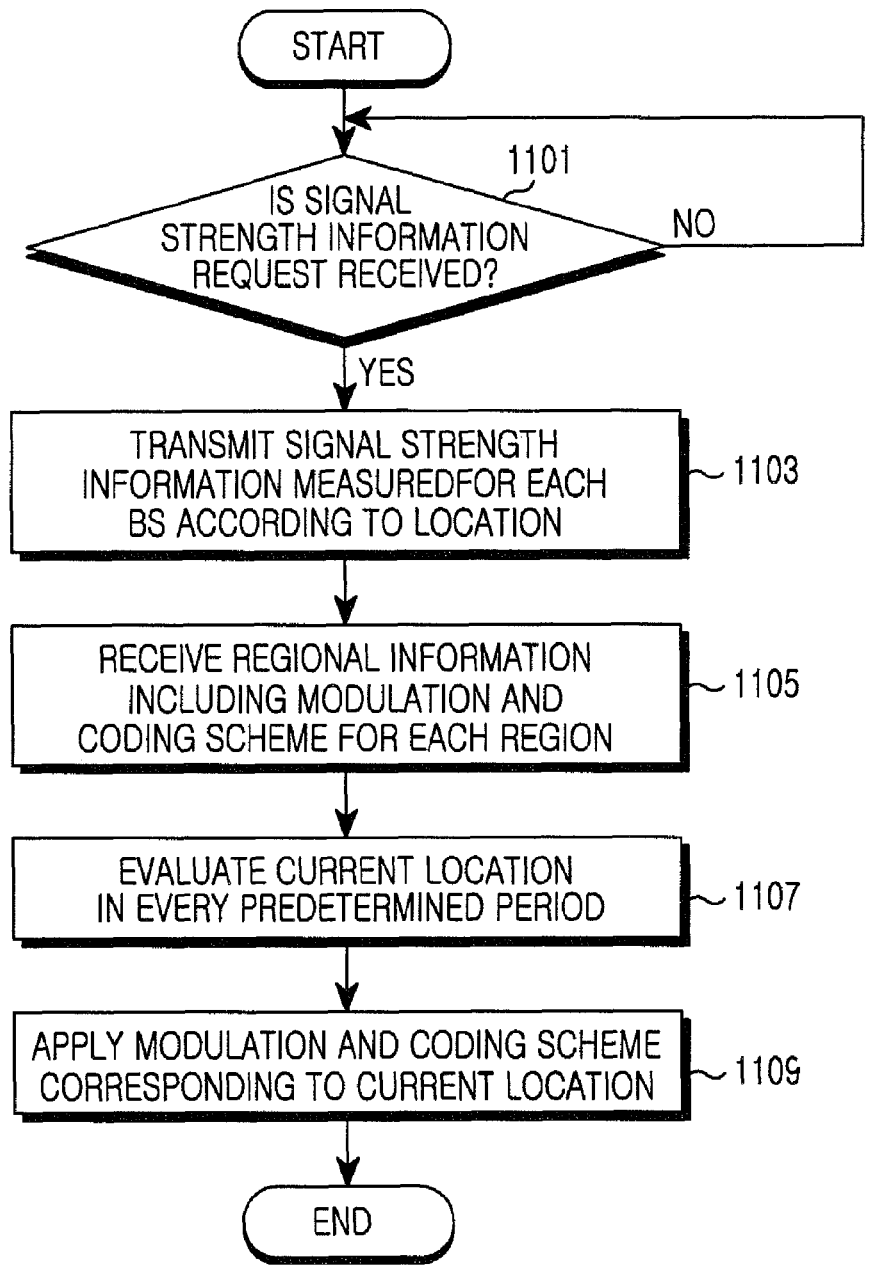
FIG. 11 is a flowchart illustrating a process of applying Adaptive Modulation Coding (AMC) of an MS by using location information in a communication system according to an exemplary embodiment of the present invention.

FIG. 11 is a flowchart illustrating a process of applying AMC of an MS by using location information in a communication system according to an exemplary embodiment of the present invention.

Referring to FIG. 11, the MS determines whether a message for requesting transmission of signal strength information is received from a serving BS of the MS in step 1101. If the message is received, proceeding to step 1103, the MS transmits received signal strength information measured for each BS according to a location of the MS. In step 1105, the MS receives regional information from the serving BS. The regional information includes a modulation and coding scheme for each region. In this case, the MS may measure instantaneous received signal strength of neighboring BSs according to the location of the MS and then transmit the measurement result to the BS. Alternatively, the MS may calculate an average of received signal strengths measured for a specific duration and transmit the measurement result to the BS.

In step 1107, the MS measures its current coordinates in every predetermined period to obtain location information. In step 1109, the MS determines a modulation and coding scheme corresponding to a current location by using the received regional information, and applies the determined modulation and coding scheme to data to be transmitted and received. Thereafter, the procedure of FIG. 11 ends.

As described above, in the present invention, the modulation and coding scheme is determined by the MS according to coordinates by using information received from the serving BS and is then applied to data to be transmitted and received. Therefore, accuracy of AMC increases in comparison with the conventional method, and thus a possibility of requesting Hybrid Automatic Repeat reQuest (HARQ) retransmission decreases. As a result, downlink and uplink cell capacity can be improved.

According to exemplary embodiments of the present invention, an MS determines its location information and generates data to be shared with a BS, wherein the data includes signal strengths of neighboring BSs, a radio wave environment, and location information of the MS. The data is used in system management such as a handover of the MS or a Tx power control operation. Therefore, entire system efficiency or performance of the MS can be improved.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

The invention claimed is:

1. A method of operating a Mobile Station (MS) to improve transmitting/receiving performance based on location information in a communication system, the method comprising:

obtaining the location information by using a navigation device;

measuring strength of a signal received from a Base Station (BS);

transmitting the measurement result and the location information to a serving BS;

receiving regional cell status information for a plurality of regions generated from the serving BS; and performing a transmitting/receiving operation, based on the regional cell status information and the location information, wherein the regional cell status information includes at least one of Transmit (Tx) power level information for a region, information of a region where a handover occurs, reference received signal strength information for a region, and modulation and coding scheme information for a region.

2. The method of claim 1, wherein when the regional cell status information includes the Tx power level information for the region, performing the transmitting/receiving operation, based on the regional cell status information and the location information comprises:

identifying a Tx power level for a region corresponding to the location information, based on the Tx power level information for the region in the regional cell status information;

determining an initial Tx power level by compensating for the identified Tx power level based on a power compensation value which is pre-stored or which is provided from the serving BS; and performing random access with the initial Tx power level.

3. The method of claim 2, wherein, the initial Tx power level is determined by taking a fading environment into account according to:

$$P\_ini = PWR\_CPMI + OFFSET\_PWR + FADE\_PWR * ALPHA$$

$$FADE\_PWR = |DL\_PWR\_CPMI - RSSI(dBm)|,$$

where P_ini denotes the initial Tx power level of the MS, PWR_CPMI denotes the Tx power level for the region, OFFSET_PWR denotes a compensation value, FADE_PWR denotes a value indicating signal strength variation depending on instantaneous fading, RSSI (dBm) denotes a downlink received signal strength, and DL_PWR_CPMI(dBm) denotes a downlink average signal strength which depends on a distance between the serving BS and the MS.

4. The method of claim 1, wherein when the regional cell status information includes the information of the region where the handover occurs, performing the transmitting/receiving operation, based on the regional cell status information and the location information comprises:

identifying the region where the handover occurs from the regional cell status information;

determining whether a location of the MS, based on the location information, corresponds to the region where the handover occurs; and performing a handover process if the location of the MS corresponds to the region where the handover occurs.

5. The method of claim 1, wherein when the regional cell status information includes the reference received signal strength information for the region, performing the transmitting/receiving operation, based on the regional cell status information and the location information comprises:

identifying a reference received signal strength for a region corresponding to the location information, based on the reference received signal strength information in the regional cell status information;

measuring a received signal strength for the serving BS;

calculating a difference between the measured received signal strength and the reference received signal strength; and transmitting Channel Quality Indicator (CQI) information including the calculated difference to the BS.

6. The method of claim 1, wherein when the regional cell status information includes the modulation and coding scheme information for the region, performing the transmitting/receiving operation, based on the regional cell status information and the location information comprises:

identifying a modulation and coding scheme for a region corresponding to the location information, based on the modulation and coding scheme information in the regional call status information; and applying the identified modulation and coding scheme to data to be transmitted and received.

7. A method of operating a Base Station (BS) to improve transmitting/receiving performance based on location information of a Mobile Station (MS) in a communication system, the method comprising:
receiving, from the MS in a cell, received signal strength information measured for a BS according to a location of the MS;
generating regional cell status information for a plurality of regions by using the received signal strength information; and
transmitting, to the MS in the cell, the generated regional cell status information,
wherein the cell status information includes at least one of Transmit (Tx) power level information for a region, information of a region where a handover occurs, reference received signal strength information for a region, and modulation and coding scheme information for a region.

8. The method of claim 7, wherein generating the regional cell status information comprises predicting a reference received signal strength for a region by using the received signal strength information.

9. The method of claim 7, wherein generating the regional cell status information comprises determining the region where the handover occurs by using the received signal strength information.

10. The method of claim 7, wherein generating the regional cell status information comprises:
predicting regional reception sensitivity by using the received signal strength; and
determining a modulation and coding scheme for a region by using the reception sensitivity, a speed of the MS, and channel estimation information.

11. A Mobile Station (MS) apparatus for improving transmitting/receiving performance based on location information in a communication system, the apparatus comprising:
a location information unit for obtaining the location information by measuring coordinates of the MS;
a radio wave environment analyzer for measuring a strength of a signal received from a Base Station (BS); and
a communication controller for transmitting, to a serving BS, the measured strength of the signal received from the BS and the location information, for receiving regional cell status information for a plurality of regions generated from the serving BS, and for performing a transmitting/receiving operation, based on the regional cell status information and the location information,
wherein the regional cell status information includes at least one of Transmit (Tx) power level information for a region, information of a region where a handover occurs, reference received signal strength information for a region. and modulation and coding scheme information for a region.

12. The apparatus of claim 11, wherein when the regional cell status information includes the Tx power level information for the region, the communication controller identifies a Tx power level for a region corresponding to the location information, based on the Tx power level information for the region in the regional cell status information, and determines an initial Tx power level by compensating for the identified Tx power level based on a power compensation value which is pre-stored or which is provided from the serving BS.

13. The apparatus of claim 12, wherein the communication unit determines the initial Tx power level by considering a fading environment according to:

$$P\_ini = PWR\_CPMI + OFFSET\_PWR + FADE\_PWR * ALPHA$$

$$FADE\_PWR = |DL\_PWR\_CPMI - RSSI(dBm)|,$$

where P_ini denotes the initial Tx power level of the MS, PWR_CPMI denotes the Tx power level for the region, OFFSET_PWR denotes a compensation value, FADE_PWR denotes a value indicating signal strength variation depending on instantaneous fading, RSSI (dBm) denotes a downlink received signal strength, and DL_PWR_CPMI(dBm) denotes a downlink average signal strength which depends on a distance between the serving BS and the MS.

14. The apparatus of claim 11, wherein when the regional cell status information includes the information of the region where the handover occurs, the communication controller determines whether a location of the MS, based on the location information, corresponds to the region where the handover occurs, and performs a handover process if the location of the MS corresponds to the region where the handover occurs.

15. The apparatus of claim 11, wherein when the regional cell status information includes the reference received signal strength information for the region, the communication controller identifies a reference received signal strength for a region corresponding to the location information, based on the reference received signal strength information in the regional cell status information, calculates a difference between a received signal strength measured for the serving BS and the reference received signal strength, and transmits the calculated difference to the BS.

16. The apparatus of claim 11, wherein when the regional cell status information includes the modulation and coding scheme information for the region, the communication controller determines a modulation and coding scheme corresponding to the location information, based on the modulation and coding scheme information in the regional cell status information, and applies the determined modulation and coding scheme to data to be transmitted and received.

17. A Base Station (BS) apparatus for improving transmitting/receiving performance based on location information of a Mobile Station (MS) in a communication system, the apparatus comprising:
a transmitting/receiving unit for receiving, from the MS in a cell, received signal strength information measured for a BS according to a location of the MS, and for transmitting, to the MS in the cell, regional cell status information; and
a regional information generator for generating the regional cell status information for a plurality of regions by using the received signal strength information,
wherein the cell status information includes at least one of Transmit (Tx) power level information for a region, information of a region where a handover occurs, reference received signal strength information for a region, and modulation and coding scheme information for a region.

18. The apparatus of claim 17, wherein the regional information generator predicts a reference received signal strength for a region by using the received signal strength information.

19. The apparatus of claim 17, wherein the regional information generator determines the region where the handover occurs by using the received signal strength information.

20. The apparatus of claim 17, wherein the regional information generator predicts regional reception sensitivity by using the received signal strength information, and determines a modulation and coding scheme for a region by using the reception sensitivity, a speed of the MS, and channel estimation information.

* * * * *